United States Patent [19]

Bourgeault et al.

[11] Patent Number: 5,019,954

[45] Date of Patent: May 28, 1991

[54] AC/DC CONVERSION WITH REDUCED SUPPLY WAVEFORM DISTORTION

[75] Inventors: Leo B. Bourgeault, Wall; Alfred W. Wohlberg, Neptune, both of N.J.

[73] Assignee: Allied-Signal Inc., Morris Township, Morris County, N.J.

[21] Appl. No.: 370,945

[22] Filed: Jun. 23, 1989

[51] Int. Cl.[5] .......................................... H02M 3/335
[52] U.S. Cl. ...................................... 363/21; 363/48; 363/71
[58] Field of Search ....................... 363/20, 21, 39, 40, 363/71, 47, 48, 65

[56] References Cited

U.S. PATENT DOCUMENTS

| | | | |
|---|---|---|---|
| 3,688,179 | 8/1972 | Burns | 363/48 |
| 4,290,101 | 9/1981 | Hergenhan | 363/21 |
| 4,386,394 | 5/1983 | Kosher et al. | 363/20 |
| 4,462,071 | 7/1984 | Blok | 363/47 |
| 4,672,522 | 6/1987 | Lesea | 363/48 |
| 4,695,935 | 9/1987 | Oen et al. | 363/71 |
| 4,760,231 | 7/1988 | Hayashi | 363/47 |
| 4,768,002 | 8/1988 | Cronin | 363/47 |
| 4,814,965 | 3/1989 | Peterson | 363/39 |
| 4,849,950 | 7/1989 | Sugiura et al. | 363/48 |

Primary Examiner—Steven L. Stephan
Assistant Examiner—Jeffrey Sterrett
Attorney, Agent, or Firm—Howard G. Massung; Robert A. Walsh

[57] ABSTRACT

Method and apparatus for performing AC/DC conversion to provide a regulated DC output with reduced distortion of the AC supply waveform. An AC supply is filtered and rectified to provide a DC signal. A plurality of flyback circuits, each having a series connection of a switch and a first winding which is connected in parallel to the rectifier circuit, as well as a second winding which is inductively related to the first winding, are provided. The second winding from each flyback circuit is connected in parallel through ORing diodes to form an output. The switches in each flyback circuit are repeatedly enabled and disabled in sequence. The first winding in each flyback circuit is energized from the DC signal when the respective series switch is enabled. When the switch is disabled, the inductively related second winding is energized. The combined output from each of the second windings provides a regulated DC signal.

20 Claims, 5 Drawing Sheets

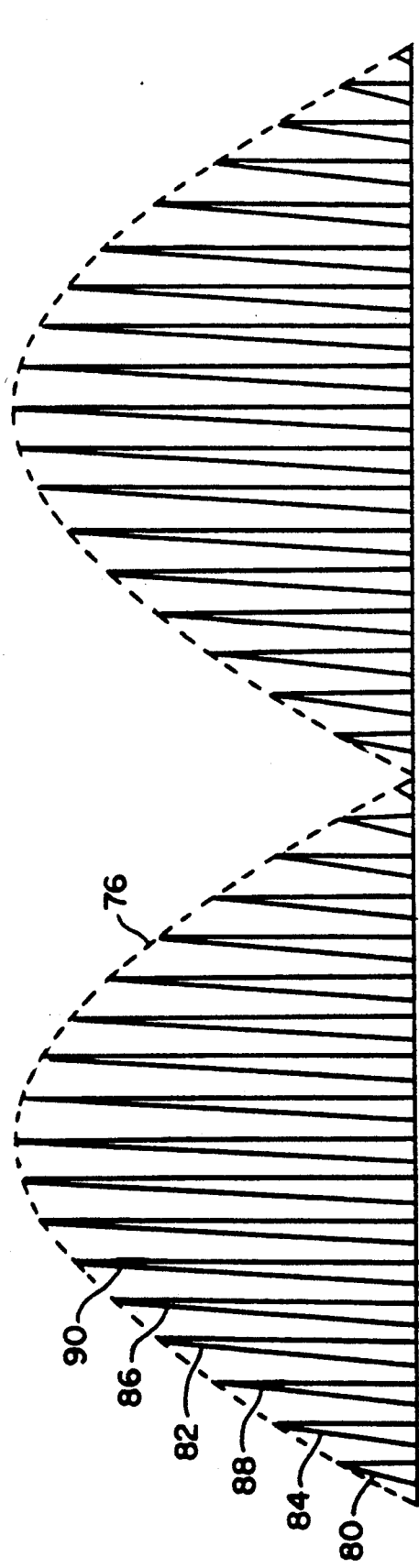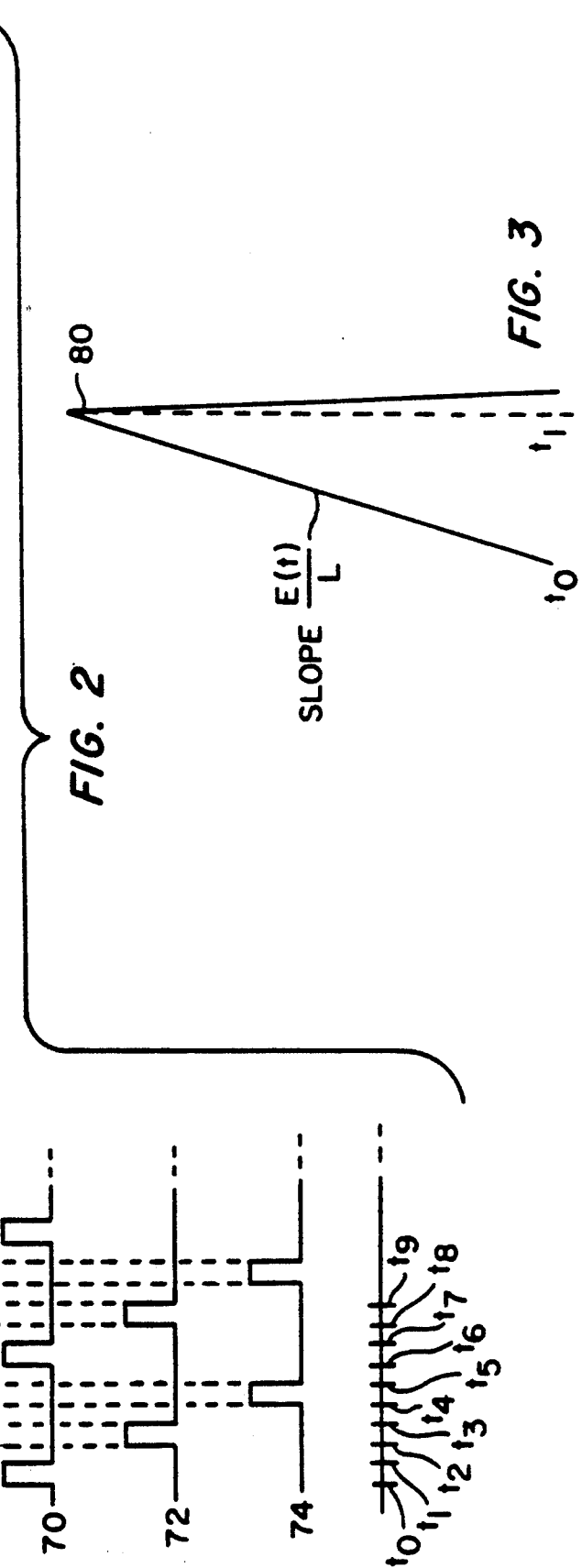
FIG. 2
FIG. 3

AC/DC CONVERSION WITH REDUCED SUPPLY WAVEFORM DISTORTION

BACKGROUND OF THE INVENTION

This invention relates to method and apparatus for performing power conversion. More specifically, it relates to method and apparatus for performing AC/DC conversion to provide a regulated DC output with reduced distortion of the input supply waveform.

Existing AC/DC conversion techniques distort the AC supply waveform as a result of harmonic feedback to the AC supply. Such distortion in the AC supply waveform can affect the use of the AC supply by other loads. Furthermore, system power losses increase because of the useless harmonic power being supplied to the various loads.

As a result, many AC/DC converters require AC filters at their input to filter out the harmonic frequencies to try to minimize the distortion of the supply waveform. In prior art AC/DC converters, the first order harmonic, which has greater amplitude than the higher order harmonics and is therefore of particular interest, is typically a low-frequency signal, so that the input filters generally require heavy electromagnetic components. The input filters in prior art AC/DC generators, therefore, are large and heavy, thereby increasing the volume and expense of AC/DC converters.

Further, the large input filters typically have a large reactance. The phase between the fundamental components of the current and the voltage in the input AC supply is, therefore, shifted by the input filters. As a result, the power factor associated with the AC supply deteriorates. Capacitors are typically used in such cases to correct the power factor, however, this causes the weight and size of the converter to further increase and can create a resonance at existing harmonic frequencies.

Method and apparatus for AC/DC conversion that results in reduced distortion of the AC supply waveform and reduced power factor deterioration of the AC supply is, therefore, needed.

SUMMARY OF THE INVENTION

The present invention is a method and apparatus for performing AC/DC conversion to provide a regulated DC signal from an AC signal with reduced distortion of the supply waveform. The present invention also reduces the deterioration of the Power factor associated with the AC supply.

The apparatus includes a first filter for filtering the AC signal, a rectifier circuit for rectifying the filtered AC signal, a plurality of flyback circuits, each having a first winding connected in series with a switch, and a second winding which is inductively related to the first winding. The first winding and the series switch are connected in parallel to the rectifier circuit. The second winding from each of the flyback circuits is connected in parallel through an ORing diode to form an output of the AC/DC converter. The apparatus further includes a controller that repeatedly and sequentially enables and disables the switch in each of the plurality of flyback circuits at a frequency greater than the frequency of the AC signal. When the switch is enabled, the first winding is energized by the current flow from the rectifier circuit. When the switch is disabled, the inductively related second winding is energized by the first winding so that a regulated signal is provided at the output.

The method includes the steps of filtering the AC signal and rectifying the filtered AC signal with a rectifier circuit. The method further includes the steps of repeatedly and sequentially enabling and disabling current flow from the rectifier circuit through each of a plurality of flyback circuits which are connected in parallel to the rectifier circuit. When current flow is enabled in one of the flyback circuits, a first winding therein is energized. When current flow is disabled, the energy in the first winding is transferred to an inductively related second winding in the flyback circuit. The second winding from each flyback circuit is connected in parallel through an ORing diode to form an output. The energy contributed by each second winding provides a regulated DC signal at the output.

DESCRIPTION OF THE DRAWINGS

FIG. 2 illustrates a first set of control signals for the switches in the AC/DC converter of the present invention and the resulting currents;

FIG. 3 illustrates an expanded view of the resulting current of FIG. 2.

DESCRIPTION OF THE PREFERRED EMBODIMENT

Figure 1:
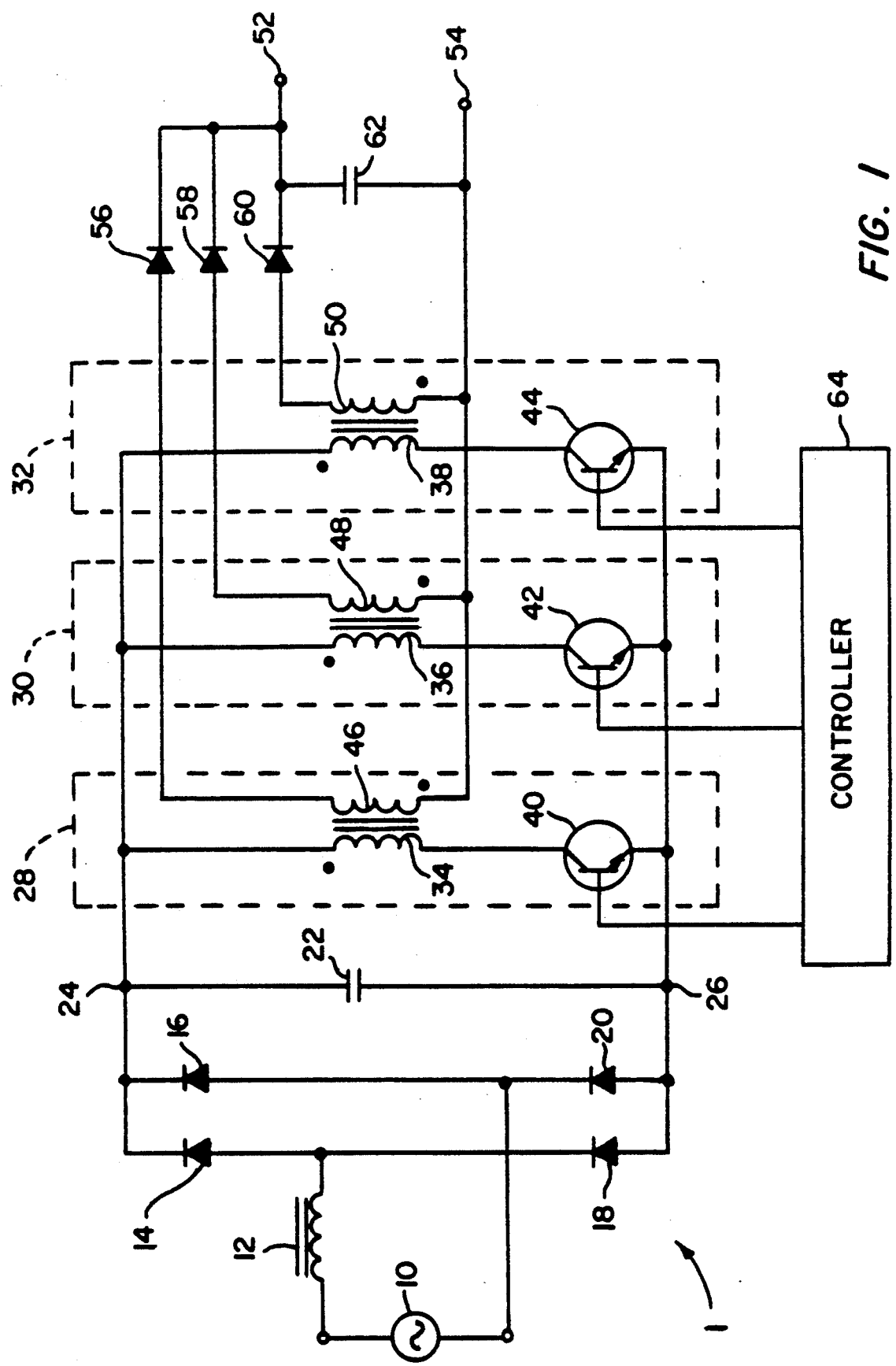
FIG. 1 illustrates a single phase AC/DC converter used in accordance with the method of the present invention.

FIG. 1 illustrates an AC/DC converter 1 in accordance with the present invention. A power supply 10 provides an AC signal. AC/DC converters create harmonics of the AC signal during the conversion process which distorts the AC signal from the supply 10. A filter 12, preferably an inductor, is provided to filter these harmonics from the AC signal.

The filtered AC signal is rectified by a full wave rectifier, preferably comprising four diodes 14, 16, 18 and 20 arranged in a bridge circuit. The output of the full wave rectifier is filtered by the capacitor 22 to smooth out the rectified signal and to provide a low impedance path for the inductor charging circuits. A DC signal, therefore, exists across the terminals 24 and 26 at the output of the rectifier.

Three flyback circuits 28, 30 and 32 are each connected in parallel to the terminals 24 and 26. Each of the circuits 28, 30 and 32 has a first winding 34, 36 and 38, respectively, connected in series with a switch 40, 42 and 44, respectively. Each of the first windings 34, 36, and 38 is inductively related to a second winding 46, 48 and 50, respectively. Each of the second windings 46, 48 and 50 are connected in parallel to the output nodes 52 and 54 through an ORing diode 56, 58 and 60, respectively. The cathode of each of the diodes 56, 58 and 60 are connected to the output node 52, and the anode of each of the diodes 56, 58 and 60 are connected to one end of the second windings 46, 48 and 50, respectively. A capacitor 62 is provided across the output nodes 52 and 54 to filter the regulated DC signal. This arrangement provides positive polarity on node 52 and negative polarization node 54. Reversing the direction of the diodes 56, 58 and 60 and reversing the coupled sense of the first and second windings in each of the playback circuits 28, 30 and 32 will result in a negative polarity on node 52 and a positive polarity on node 54, if so desired.

A controller circuit 64 is provided to repeatedly enable and disable each of the switches 40, 42 and 44 in sequence. Any of the different type transistors, such as MOSFET, IGBT or Bipolar, can be used to implement the switches 40, 42 and 44. The controller circuit 64 enables and disables the transistors 40, 42 and 44 by selectively controlling the voltage at the base of each transistor 40, 42 and 44. If a higher switching rate is needed, then the switches 40, 42 and 44 must be selected accordingly. The controller circuit 64 can be any circuit which provides oscillating outputs to control the switches 40, 42 and 44. For example, the oscillator circuit 64 can be an oscillator with phase shifted outputs for each switch 40, 42 and 44, a plurality of oscillators or a pulse width modulator. In the case of the pulse width modulator the output can be fed back to control the pulse width of the control signals from the controller 64 to the transistors 40, 42 and 44 to control the amplitude of the regulated DC signal at output nodes 52 and 54.

Referring to FIG. 2, the operation of the circuit in accordance with nonoverlapping control signals 70, 72 and 74 is now discussed. The AC signal from the power supply 10 is filtered and rectified to provide a DC signal at the terminals 24 and 26. The controller 64 repeatedly and sequentially enables and disables the transistors 40, 42 and 44 with the control signals 70, 72 and 74, respectively, such that a switch in one flyback circuit is enabled and disabled before a switch in a next flyback circuit is enabled. The signal 76 represents the rectified and smoothed fundamental voltage from the input supply 10 which would exist at the terminals 24 and 26 if the flyback circuits 28, 30 and 32 were omitted.

When the signal 70 goes high during the periods $t_0$ to $t$, $t_6$ to $t_7$ and so on, the transistor 40 is enabled so that current flows through the winding 34. The resulting current during the period $t_0$ to $t_1$ is a pulse 80 and during the period $t_6$ to $t_7$ is another pulse 82. In a similar fashion, when the signal 72 goes high during the periods $t_2$ to $t_3$, $t_8$ to $t_9$ and so on, the transistor 42 is enabled so that current flows through the winding 36. The resulting current, during the period $t_2$ to $t_3$, is a pulse 84 and during the period $t_8$ to $t_9$ is a pulse 86. The pulses 88 and 90 result when the signal 74 enables current flow in the winding 38.

Referring to FIG. 3, an expanded view of the first current pulse 80 is illustrated. When the transistor 40 is enabled, the current increases at the rate of $E(t)/L$, where $E(t)$ is the voltage at the terminals 24 and 26 at time $t$ and L is the inductance of the winding 34. The current increases at the rate of $E(t)/L$ until time $t_1$. When the control signal 70 disables the switch 40 at time $t_1$, the energy in the winding 34 is transferred to the inductively related winding 46, where the transferred energy contributes to the voltage at the output nodes 52 and 54. The current pulse 80, therefore, decreases rapidly at time $t_1$. The remaining pulses 82 to 90 exhibit similar characteristics.

The energy stored in the windings 34, 36 and 38 as a result Of the pulses 80 to 90 is transferred to the inductively related second windings 46, 48 and 50, respectively, when the transistors 40, 42 and 44, respectively, are turned off to disable current flow. The energy in the second windings 46, 48 and 50 is then supplied to a load at the output nodes 52 and 54 through the ORing diodes 56, 58 and 60, respectively. The resulting signal at the output nodes 52 and 54 is smoothed by the capacitor 62.

The inductive first and second winding are arranged to provide the greatest coupling with the least leakage flux between the two windings. Standard techniques, such as bipolar windings, can be used in the construction of the first and second windings. The use of the two inductively related windings in each flyback circuit provides isolation between the converter output and the converter input.

The control signals for the transistors 40, 42 and 44 can be operated in an overlapping manner. Overlapping control signals reduce the requirements on the filter capacitors 22 and 62. They also further reduce the harmonics generated by the AC/DC converter 1, thereby reducing the requirement on the filter 12.

Figure 4:
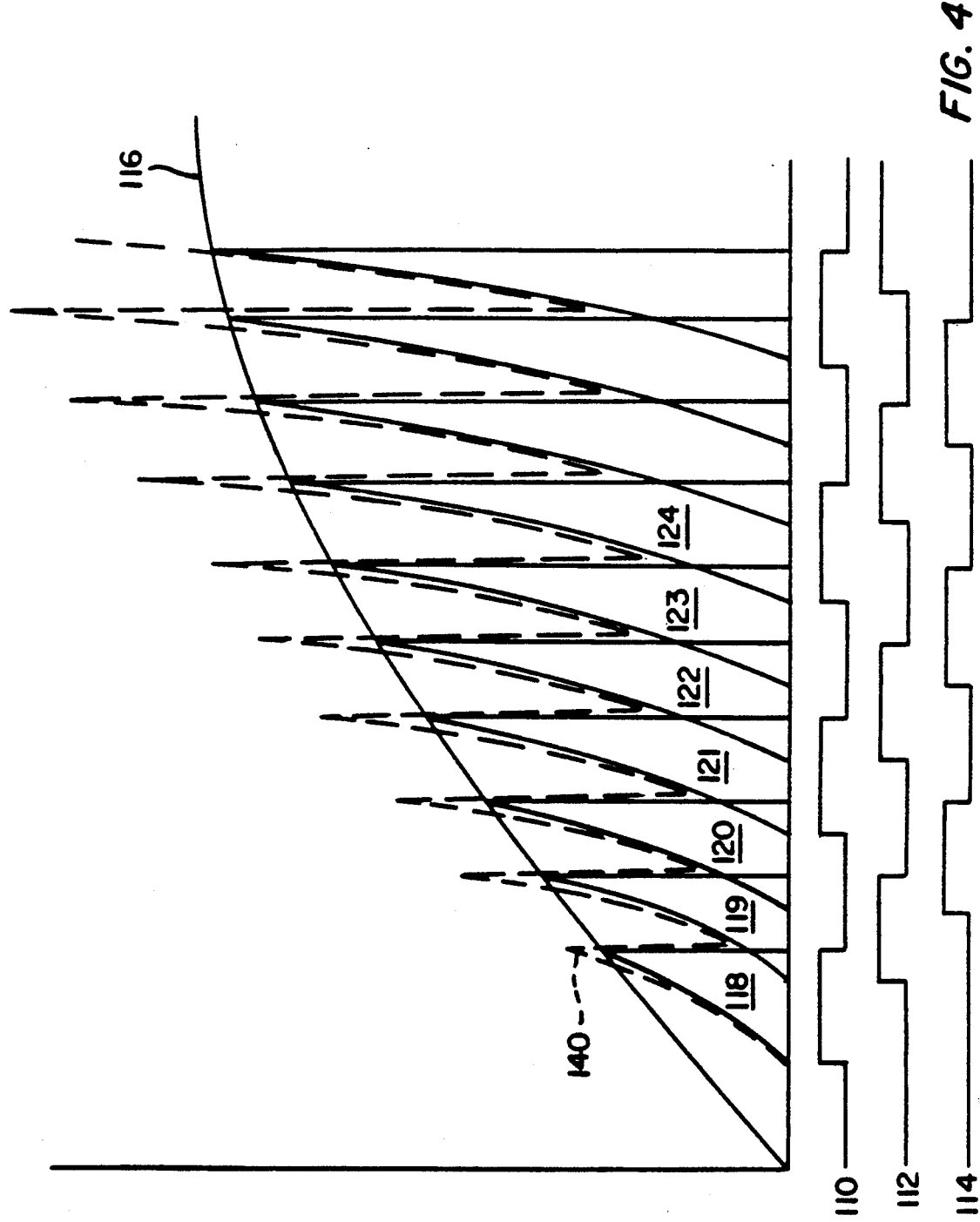
FIG. 4 illustrates a second set of control signals for the switches in the AC/DC converter of the present invention and the resulting currents.

Referring to FIG. 4, the overlapping signals 110, 112 and 114 control the transistors 40, 42 and 44, respectively. Signal 116 is the rectified and smoothed fundamental voltage from the input supply 10 which would exist at the terminal 24, if the flyback circuits 28, 30 and 32 were omitted. When the control signals 110, 112 and 114 enable and disable the transistors 40, 42 and 44, respectively, the current at the terminals 24 comprises a summation 140 of a series of pulses 118 through 124. It is seen that at the overlapping control signals 110, 112 and 114 result in a faster switching rate for the transistors 40, 42 and 44. It further results in a reduced gap between the pulses. The filter required to smoother the pulse train is, therefore, smaller than in the case of FIG. 2.

The AC/DC converter 1, whether non overlapping or overlappinq control signals are used, advantageously creates harmonics, in particular the first order harmonic, at a higher frequency than conventional AC/DC converters. The first order harmonic is the most important frequency because it has greater amplitude than higher order harmonics. The AC/DC converter 1 of the present invention, therefore, eases the requirements on the filter 12, as smaller and lighter electromagnetic components can be used to filter out the higher frequency first order harmonic created by the AC/DC converter 1 of the present invention.

The frequency of the first harmonic created by the AC/DC converter 1 of the present invention is defined by the following equation:

where M is the number of flyback circuits and N is the number of times per period the switches are enabled and f is the fundamental frequency of the AC signal supplied by the power supply 10. The characteristics required of the filter formed by the inductor 12 and capacitor 22 can, therefore, be tailored by the appropriate selection of the above parameters. Since this filter is to be designed to filter out the harmonics being fed back to the AC signal and since the first harmonic has the largest amplitude, the cutoff frequency of the filter should be equal to this first harmonic frequency.

A further advantage of the AC/DC converter 1 is the improved power factor of the supply 10. Normally, the large input filters required to filter out the low frequency harmonics created by prior art converters are large in size and in reactance. Resulting from the large reactance, the current and voltage in the fundamental AC signal are phase shifted, so that the power factor associated with the supply signal deteriorates. The AC/DC converter 1, of the present invention, by permitting the use of a smaller filter with a small reactance at the input as a result of the higher frequency harmonics, reduces the phase shift, thereby obtaining a higher effective power factor.

Although the AC/DC converter 1 of FIG. 1 shows three flyback circuits 28, 30 and 32, only two such flyback circuits are needed. Additionally, any number of flyback circuits can be utilized. The number depends on the amount of output current overlap desired and the first harmonic order to be filtered. Further, in areas where the energy to be transferred exceeds component ratings, additional flyback circuits can be paralleled so that component ratings are not exceeded.

Figure 5:
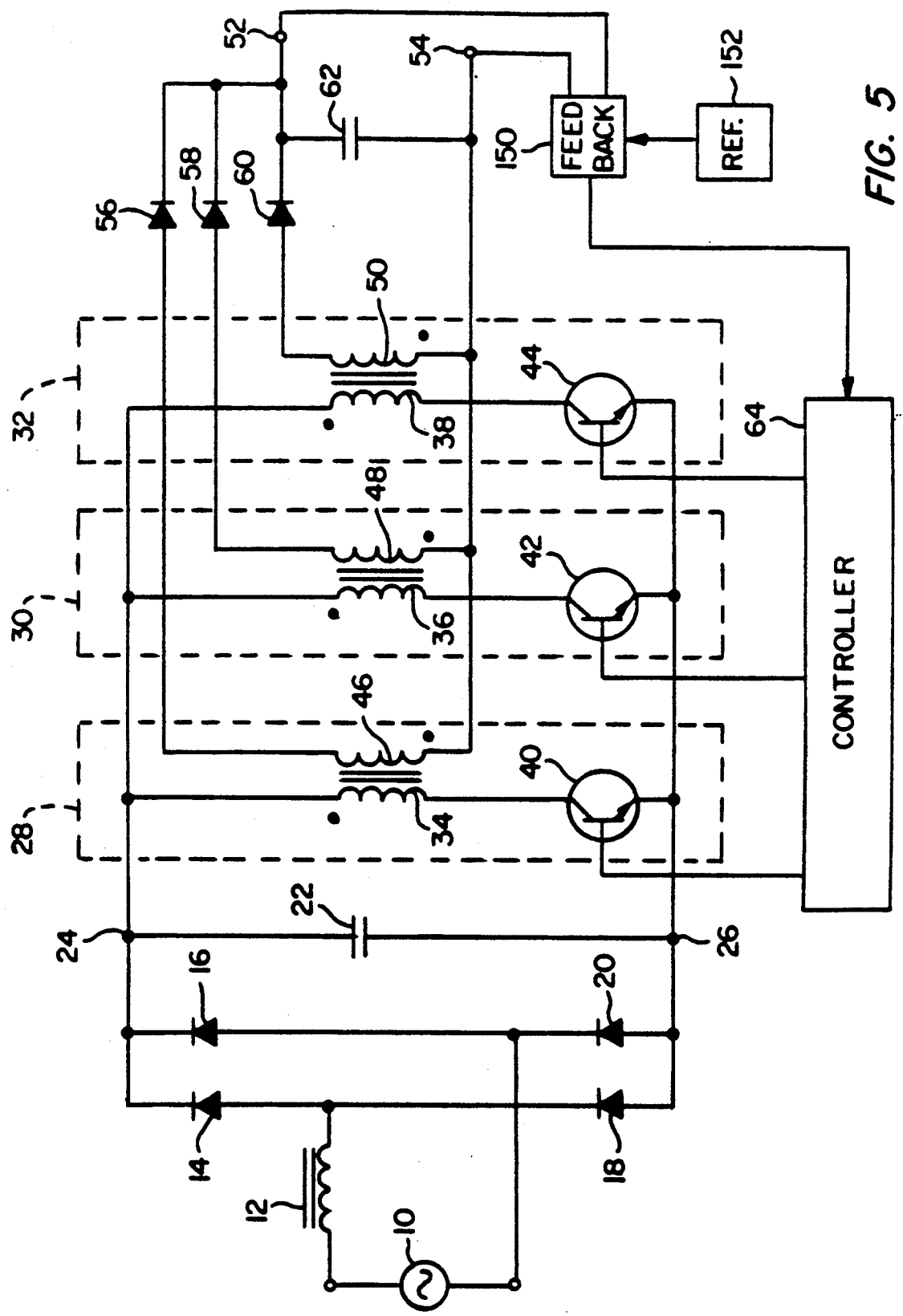
FIG. 5 illustrates the AC/DC converter of the present invention wherein the output is fed back to the controller; and, FIG. 6 illustrates a three phase AC/DC converter in accordance with the present invention.

FIG. 5 illustrates the use of a feedback circuit 150 in the AC/DC converter of the present invention. The feedback circuit 150 is connected to the output nodes 52 and 54 and to the controller circuit 64. The feedback circuit 150 compares the voltage at the nodes 52 and 54 to a reference 152 and causes the controller circuit 64 to control the transistors 40, 42 and 44 accordingly. In this case, it is preferable that the controller circuit 64 be a pulse width modulator wherein the width of the control signal for the transistors 40, 42 and 44 is varied in accordance with the feedback circuit 150. This controls the amount of time the transistors 40, 42 and 44 are enabled and, therefore, the amount of energy built up in each of the first windings 34, 36 and 38 and, subsequently, the amount of energy transferred to the second windings 46, 48 and 50. In this way, a precise amplitude at the output nodes 52 and 54 can be maintained.

Figure 6:
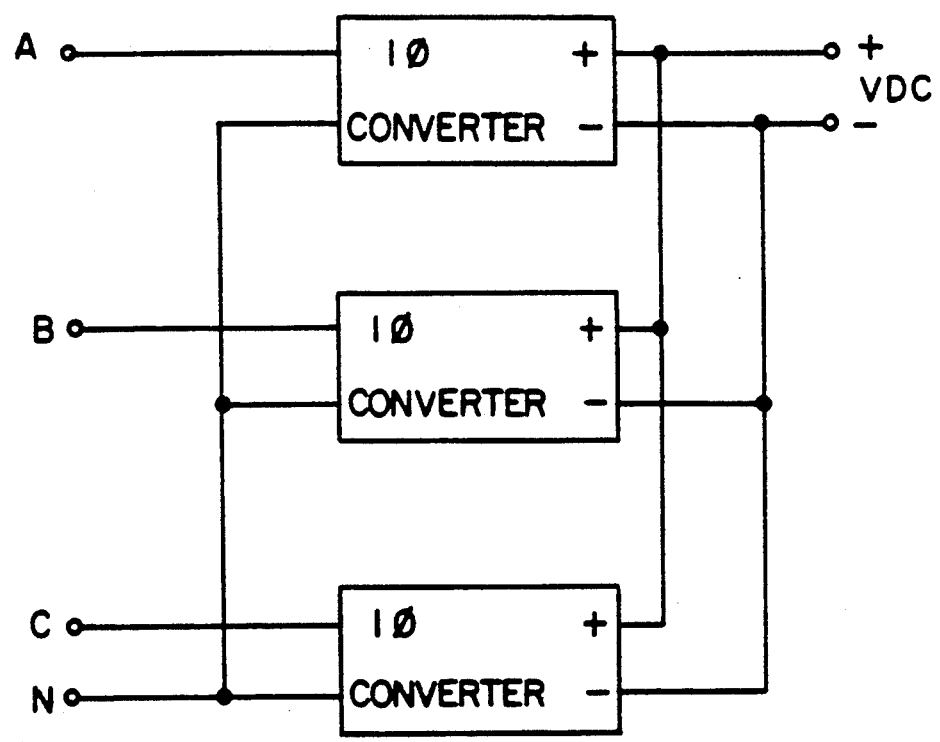

The invention may also be utilized in a three phase configuration. To do so the single phase AC/DC converter 1 of FIG. 1 is utilized three times as illustrated in FIG. 6. Each phase of the three phase input supply is connected to one of the AC/DC converter as 1. The outputs of the converters 1 are tied together as illustrated. A single controller circuit 64 can be used to control the respective transistors from each AC/DC converters, as shown. Alternatively, a controller circuit can be supplied for each AC/DC converter if special controlling characteristics are desired.

We claim:

1. An AC/DC converter for providing a regulated DC signal from an AC signal, comprising:
    first filter means for filtering a harmonic frequency fed back to the AC signal;
    rectifier means connected to said first filter means for rectifying the AC signal to provide a DC signal across two terminals of said rectifier means;
    a plurality of flyback circuits, each having a first winding connected in series with switching means for enabling and disabling current flow which are connected in parallel to said rectifier means, each of said plurality of flyback circuits further having a second winding which is inductively related to said first winding, said second winding from each of said plurality of flyback circuits being connected in parallel through an ORing diode at an output of the AC/DC converter;
    controller means for repeatedly and sequentially enabling and disabling said switching means in each of said plurality of flyback circuits such that said first winding in each of said plurality of flyback circuits is energized by said DC signal when said series switching means is enabled and said second winding in each of said plurality of flyback circuits is energized by said inductively related first winding when said series switching means is disabled so as to provide the regulated DC signal at said output of the AC/DC converter; and
    the cutoff frequency of the first filter means is MNf, where f equals the frequency of the AC signal, M equals the number of flyback circuits and N equals the number of times per period of the AC signal that said switching means are enabled and disabled.

2. The AC/DC converter as claimed in claim 1, further comprising:
    second filter means for filtering said regulated DC signal.

3. The AC/DC apparatus as claimed in claim 1, wherein said switching means in each of said plurality of flyback circuits is enabled and disabled at a frequency greater than the frequency of the AC signal.

4. The AC/DC converter as claimed in claim 1, wherein said first and second windings in each of said flyback circuits isolates said output of the AC/DC converter from an input of the AC/DC converter.

5. The AC/DC converter as claimed in claim 1, wherein said first filter means is an inductor and a capacitor.

6. The AC/DC converter as claimed in claim 1, wherein the power factor associated with the AC signal is near unity.

7. The AC/DC converter as claimed in claim 1, wherein the AC signal has low harmonic content.

8. The AC/DC converter as claimed in claim 1, wherein said switching means in one of said plurality of flyback circuits is enabled and disabled before said switching means in a next of said plurality of said flyback circuits is enabled and disabled.

9. The AC/DC converter as claimed in claim 1, wherein said switching means in one of said plurality of flyback circuits is enabled and disabled in an overlapping fashion with said switching in a next of said plurality of flyback circuits.

10. The AC/DC converter as claimed in claim 1, further comprising feedback means connected between said output of said AC/DC converter and said controller means for controlling said controller means in accordance with the regulated DC signal at said output to obtain a desired amplitude.

11. The AC/DC converter as claimed in claim 1, wherein the AC signal is a polyphase signal and said first filter means, said rectifier means, said plurality of flyback circuits and said controller means are provided for each of said phases.

12. The AC/DC converter as claimed in claim 1, wherein the AC signal is a polyphase signal and said first filter means, said rectifier means and said plurality of flyback circuits are provided for each of said phases and one of said controller means is provided for controlling each of said plurality of flyback circuits in each of said phases.

13. A method of performing AC/DC conversion to provide an regulated DC signal from an AC signal comprising the steps of:
    filtering the AC signal with a first filter to reduce harmonic frequencies fed back to the AC signal
    rectifying the AC signal with a rectifier circuit to provide a DC signal across two terminals of said rectifier circuit;
    repeatedly and sequentially enabling and disabling a switch in each of a plurality of flyback circuits, each of said plurality of flyback circuits having a first winding connected in series with said switch which is connected in parallel across said terminals of said rectifier circuit and a second winding which is inductively related to said first winding, said second winding from each of said plurality of flyback circuits being connected in parallel at an output, such that said first winding in each of said plurality of flyback circuits is energized by said DC signal when said switch is enabled and said second winding in each of said plurality of flyback circuits is energized by said inductively related first winding when said switch is disabled so as to provide the regulated DC signal at said output; and the cutoff frequency of said first filter is MNf, where f equals the frequency of the AC signal, M equals the number of flyback circuits and N equal the number of times per period of the AC signal that said switching means are enabled and disabled.

14. The method as claimed in claim 4, wherein said switching means in each of said plurality of flyback circuits is enabled and disabled at a frequency greater than the frequency of the AC signal.

15. The method as claimed in claim 13, further comprising the steps of:
filtering said regulated DC signal with a second filter.

16. The method as claimed in claim 13, wherein each of said switches in said plurality of flyback circuits is enabled and disabled at a frequency greater than the frequency of the AC signal.

17. The method as claimed in claim 13, wherein said switch in one of said plurality of flyback circuits is enabled and disabled in an overlapping fashion with said switch in a next of said plurality of flyback circuits.

18. The method as claimed in claim 13, wherein the power factor associated with the AC signal is near unity.

19. The method as claimed in claim 13, wherein the AC signal has low harmonic content.

20. The method as claimed in claim 13, wherein said switch in one of said plurality of flyback circuits is enabled and disabled before said switch in a next of said plurality of said flyback circuits is enabled and disabled.

* * * * *